United States Patent [19]

Sato et al.

[11] Patent Number: 4,556,599

[45] Date of Patent: Dec. 3, 1985

[54] HEAT REFLECTION FILM

[75] Inventors: Susumu Sato; Tadashi Hattori; Yoshiki Ueno; Takashi Taguchi, all of Okazaki, Japan

[73] Assignee: Nippon Soken, Inc., Nishio, Japan

[21] Appl. No.: 664,396

[22] Filed: Oct. 23, 1984

Related U.S. Application Data

[63] Continuation of Ser. No. 495,606, May 18, 1983, abandoned.

[30] Foreign Application Priority Data

May 20, 1982 [JP] Japan .................... 57-86033

[51] Int. Cl.$^4$ ............. G02B 5/22; B32B 17/06
[52] U.S. Cl. ...................... 428/216; 350/1.6; 350/164; 350/166; 427/165; 427/169; 428/699; 428/701; 428/432
[58] Field of Search ............. 427/165, 169; 428/432, 428/426, 701, 699, 212, 216, 215; 350/164, 1.6, 166

[56] References Cited

U.S. PATENT DOCUMENTS

| Re. 25,767 | 4/1965 | Guffenorde | 428/432 |
|---|---|---|---|
| 2,617,741 | 11/1952 | Lytle | 117/54 |
| 2,624,823 | 6/1953 | Lytle | 428/432 |
| 2,698,261 | 12/1954 | Gaiser | 428/432 |
| 2,772,190 | 11/1956 | Haayman et al. | 117/211 |
| 3,053,698 | 9/1962 | Ogle | 428/432 |
| 3,356,522 | 12/1967 | Libbert | 428/412 |
| 3,356,523 | 12/1967 | Libbert | 428/696 |
| 3,853,386 | 12/1974 | Ritter | 428/701 |
| 4,070,781 | 1/1978 | Sauer | 428/432 |
| 4,128,303 | 12/1978 | Onoki | 427/165 |
| 4,229,066 | 10/1980 | Rancourt | 350/164 |
| 4,244,997 | 1/1981 | Postupach | 428/174 |
| 4,286,009 | 8/1981 | Griest | 428/212 |
| 4,370,027 | 1/1983 | Sato | 350/164 |
| 4,461,532 | 7/1984 | Sato | 350/1.6 |
| 4,504,109 | 3/1985 | Taga | 350/1.6 |

OTHER PUBLICATIONS

Zednek, Knittl; "Optics of Thin Films", 1976, pp. 104–105 and 152–153.

Primary Examiner—Ellis P. Robinson
Attorney, Agent, or Firm—Cushman, Darby & Cushman

[57] ABSTRACT

A heat-reflection film comprising:

a first layer formed on a base plate, the optical thickness of the first layer being approximately $\lambda/8$ or $3\lambda/8$, in which $\lambda$ is the designed wavelength;

a plurality of intermediate layers from a second layer to a $(2n+2)$th layer, in which n is a positive integral number, the optical thickness of each intermediate layer being $\lambda/4$; and an uppermost $(2n+3)$th layer, the optical thickness of which is approximately $\lambda/8$, wherein $n_g < n_1 < n_2$, in which $n_g$ is the refractive index of the base plate, $n_1$ is the refractive index of the first layer, and $n_2$ is the refractive index of the second layer, the layers formed above the first layer being arranged in such a manner that high refractive index layers and low refractive index layers are alternately stacked, the second layer being arranged as a high refractive index layer.

7 Claims, 7 Drawing Figures

HEAT REFLECTION FILM

This is a continuation of application Ser. No. 495,606, filed May 18, 1983 now abandoned.

BACKGROUND OF THE INVENTION

1. Field of the Invention

The present invention relates to a heat-reflection film which effectively reflects heat rays in sunlight while sufficiently passing visible rays therethrough. Such a heat-reflection film is coated on the windshield of a vehicle or the windowpanes of a building so as to reduce the cooling load of the air-conditioning system of the vehicle or the building.

2. Description of the Prior Art

Conventionally, in order to reduce the cooling load of an air-conditioning system of a vehicle or a building, attempts have been made to coat a heat-reflection film on the windshield or the windowpanes so as to intercept the heat rays in sunbeams. This type of film is made of a metal such as gold or silver or a combination of such a metal and a dielectric material. However, this type of film is disadvantageous in that the view therethrough is not clear since visible rays do not sufficiently pass therethrough and in that part of the heat absorbed by the film is transmitted into the interior of the vehicle or the building. On the other hand, in an interference filtering film composed of a plurality of dielectric layers, visible rays can pass therethrough while infrared rays are reflected since the optical thickness of each layer thereof is appropriately selected. A heat-reflection film comprising the conventional interference filtering film comprises one or more dielectric layers of high refractive index material and one or more dielectric layers of low refractive index material. The high refractive index layers and the low refractive index layers are alternately stacked on a base plate which is transparent for visible rays. The optical thickness (the refractive index x the thickness of a layer) of each of the high refractive index layers and the low refractive index layers is $\lambda/4$, in which $\lambda$ is the designed wavelength, i.e., the planned wavelength of the heat rays to be reflected by the interference filtering film as a purpose. Each of the high and the low refractive index layers is formed on the base plate by a spattering method, a vacuum evaporation method, a spraying method, or the like so that the formed layer has a predetermined optical thickness. Visible rays penetrate the interference filtering film comprising the above-mentioned dielectric layers having an optical thickness of $\lambda/4$ while the heat rays are reflected by the interference filtering film. However, the visible rays do not sufficiently pass through the above-mentioned heat-reflection film of the prior art. Part of the visible rays are reflected by the film on the base plate. Therefore, the reflection factor of the base plate coated with the heat-reflection film is a couple of times higher than that of the base plate not coated with a heat-reflection film. Therefore, the heat-reflection film of the prior art does not sufficiently satisfy the requirement that the heat rays be fully reflected while minimizing the reflection factor of the visible rays. When the heat-reflection film of the prior art is coated on a windshield, the view through the windshield is degraded and pedestrians or other drivers are blinded by the light reflected by the windshield.

SUMMARY OF THE INVENTION

An object of the present invention is to provide a heat-reflection film which sufficiently reflects heat rays while suppressing the reflection of visible rays so that the reflection factor of a base plate coated with the heat-reflection film with respect to the visible rays is equal to or even lower than that of a noncoated base plate.

A heat-reflection film according to the present invention comprises: a first layer formed on a base plate which is transparent for visible rays, the optical thickness of the first layer being approximately $\lambda/8$ or $3\lambda/8$, in which $\lambda$ is the designed wavelength; a plurality of intermediate layers from a second layer to a $(2n+2)$th layer, in which n is a positive integral number, the optical thickness of each intermediate layer being $\lambda/4$; and an uppermost $(2n+3)$th layer, the optical thickness of which is approximately $\lambda/8$, wherein $n_g < n_1 < n_2$, in which $n_g$ is the refractive index of the base plate, $n_1$ is the refractive index of the first layer, and $n_2$ is the refractive index of the second layer, the layers formed above the first layer being arranged in such a manner that high refractive index layers and low refractive index layers are alternately stacked, the second layer being arranged as a high refractive index layer.

DESCRIPTION OF THE PREFERRED EMBODIMENTS

The embodiments of the present invention are described hereinafter with reference to the drawings.

Figure 1:
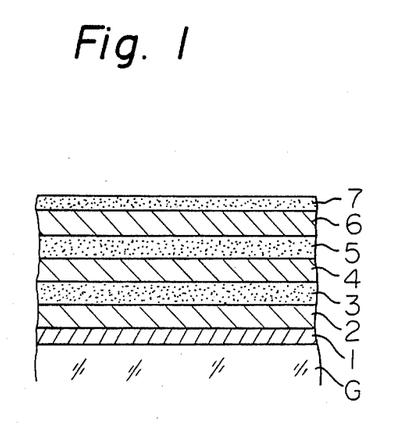
FIG. 1 is a sectional view of an embodiment of the present invention.

An example of the heat-reflection film according to the present invention is illustrated in section in FIG. 1. This heat-reflection film has seven layers in total. Each of the five intermediate layers (from the second layer to the sixth layer ($n=2$)) of the heat-reflections film has an optical thickness of $\lambda/4$. The heat-reflection film is formed on a base plate G of glass (refractive index $n_g = 1.53$) which is transparent for visible rays. The first layer 1 is made of aluminium oxide ($Al_2O_3$) or cerium fluoride ($CeF_3$) and has a refractive index $n_1$ of from 1.6 to 1.7. The optical thickness of the first layer 1 is $\lambda/8$. The second layer 2, the fourth layer 4, and the sixth layer 6 are made of cerium oxide ($CeO_2$) or titanium oxide ($TiO_2$) and have a refractive index $n_2$, $n_4$, and $n_6$, respectively, of from 2.2 to 2.6. The optical thickness of the second, fourth, and sixth layers 2, 4, and 6 is $\lambda/4$. The third layer 3 and the fifth layer 5 are made of silicon oxide ($SiO_2$) and have a refractive index $n_3$ and $n_5$, respectively, 1.4 to 1.5. The optical thickness of the third layer 3 and the fifth layer 5 is $\lambda/4$. The seventh layer 7 is made of silicon oxide ($SiO_2$) and has a refractive index $n_7$ of from 1.4 to 1.46. The optical thickness of the seventh layer 7 is $\lambda/8$.

Figure 2:
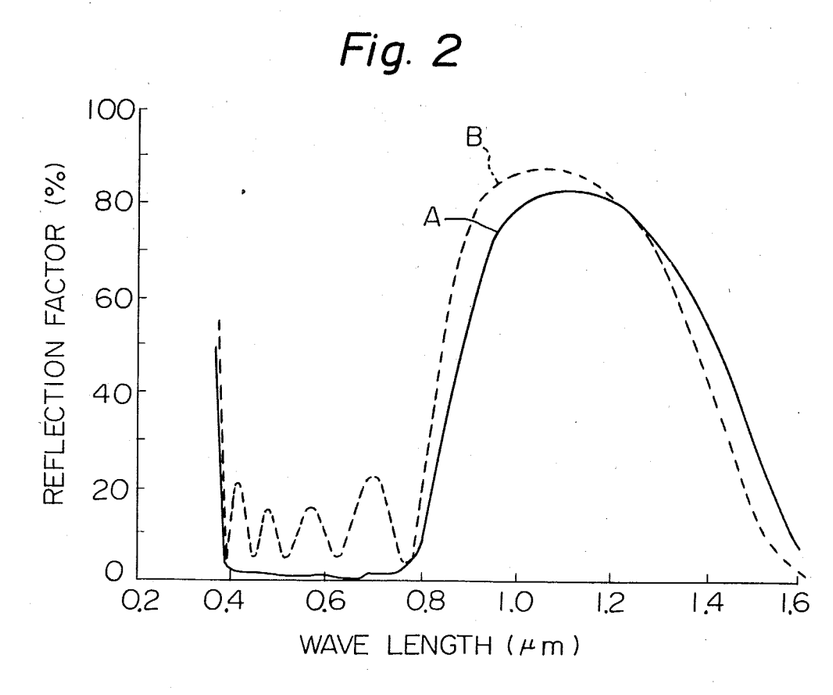
FIG. 2 is a graph showing the reflection factor of the heat-reflection film of FIG. 1 and that of the prior art.

The reflection factor of the above-mentioned heat-reflection film is shown in FIG. 2. The designed wavelength $\lambda$ of heat rays to be reflected is 1.04 $\mu$m. The solid line A represents the reflection factor of the heat-reflection film of the present invention. The broken line B represents the reflection factor of the heat-reflection film of the prior art, which film comprises five layers, each layer having an optical thickness of $\lambda/4$ and corresponding to the second to sixth layers 2 to 6 of the present invention, formed on the base plate of glass, layers corresponding to the first layer 1 and the seventh layer 7 of the present invention not being formed. As can be seen from FIG. 2, with respect to visible rays (of from 0.4 to 0.7 $\mu$m), small reflection peaks occur in the case of line B while such reflection peaks are suppressed in the case of line A so that the reflection of visible rays is minimized.

Concerning the intermediate layers, i.e., the second to the sixth layers, the reflection of heat rays is upgraded as the difference of the refractive index of the high refractive index layers 2, 4, and 6 and of the low refractive index layers 3 and 5 is increased.

Also, the reflection of heat rays is upgraded when the refractive index of the seventh layer 7 is small. The seventh layer 7 may be made of magnesium fluoride ($MgF_2$) instead of $SiO_2$.

The high refractive index layers 2, 4, and 6 may be made of zirconium, oxide ($ZrO_2$), titanium oxide ($TiO_2$), cerium oxide ($CeO_2$), or the like. The low refractive index layers 3 and 5 may be made of magnesium fluoride ($MgF_3$), silicon oxide ($SiO_2$), quartz ($Na_3AlF_6$), cerium fluoride ($CeF_4$), or the like.

The material of each layer of the high refractive index layers may be different from that of the other layers. However, it is advantageous to use the same material from the viewpoint of productivity. Also, the material of each layer of the low refractive index layers may be different from that of the other layers. However, again, it is advantageous to use the same material from the viewpoint of productivity.

Any kind of material which satisfies $n_g < n_1 < n_2$ may be used for the material of the first layer 1 instead of $Al_2O_3$ or $CeF_3$ of $n_1$ from 1.6 to 1.7.

Figure 3:
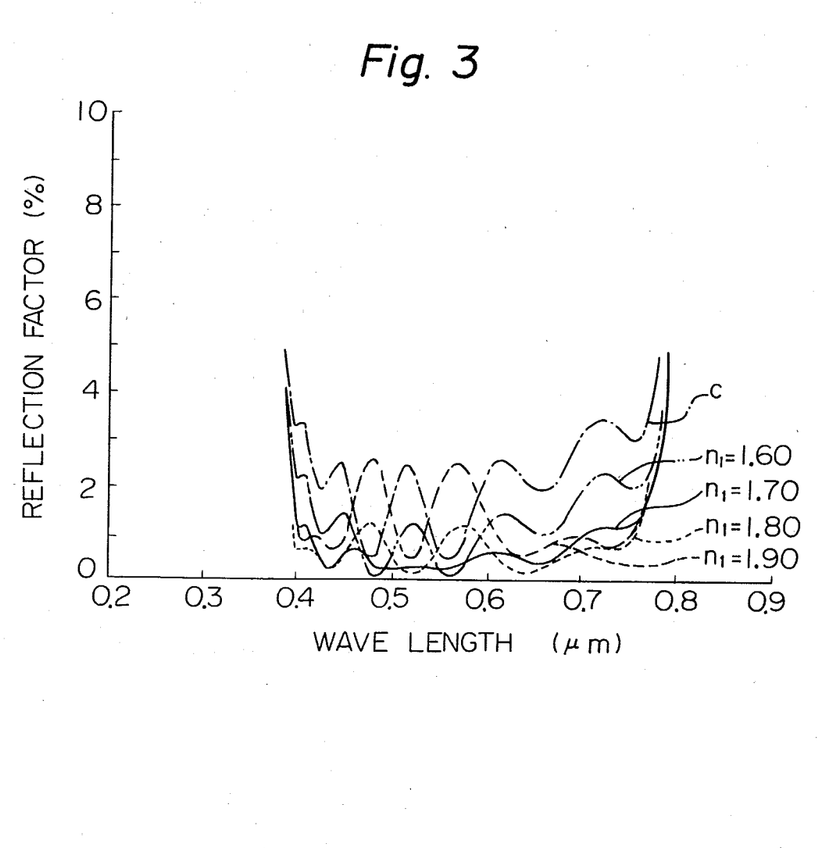
FIG. 3 is a graph showing the reflection factor of the heat-reflection film of FIG. 1 in which the refractive index of the first layer is changed.

The graph of FIG. 3 shows the reflection factor of the heat-reflection film of FIG. 1, in which the refractive index $n_1$ of the first layer 1 is changed. The graph represents the reflection factor with respect to the wavelength of visible rays. The reflection factor of the heat-reflection film with respect to the wavelength of heat rays is almost unchanged irrespective of a change of the refractive index $n_1$ of the first layer 1. The clash-lot line C represents the reflection factor of the heat-reflection film without the first layer, that is, a case which is the same as the case of $n_1 = n_g$. As can be seen from FIG. 3, it is effective to dispose on the base plate a first layer having a refractive index $n_1$ which satisfies $n_g < n_1 < n_2$ in order to suppress the reflection of visible rays. Especially, it is effective to use material having a refractive index $n_1$ of from 1.7 to 1.8. By using such material, the average reflection factor for visible rays having a wavelength of from 0.4 to 0.7 $\mu$m can be lowered to 0.5% from 10%, which is the value of the prior art. The material of the first layer may be cerium fluoride ($CeF_3$), aluminium oxide ($Al_2O_3$), tin oxide ($SnO_2$), lead fluoride ($PbF_3$), neodymium fluoride ($NdF_3$), praseodymium oxide ($Pr_6O_{11}$), indium oxide ($In_2O_3$), or the like, a combination thereof, or a mixture of zirconium oxide ($ZrO_2$) and magnesium fluoride ($MgF_2$). Also, an electrically conductive, optically transparent material such as a mixture of $In_2O_3$ and $SnO_2$ or a mixture of $SnO_2$ and antimony oxide ($Sb_2O_3$) may be used as the first layer material. By using such a conductive material, the first layer can be used as a heater by applying a current thereto.

Figure 4:
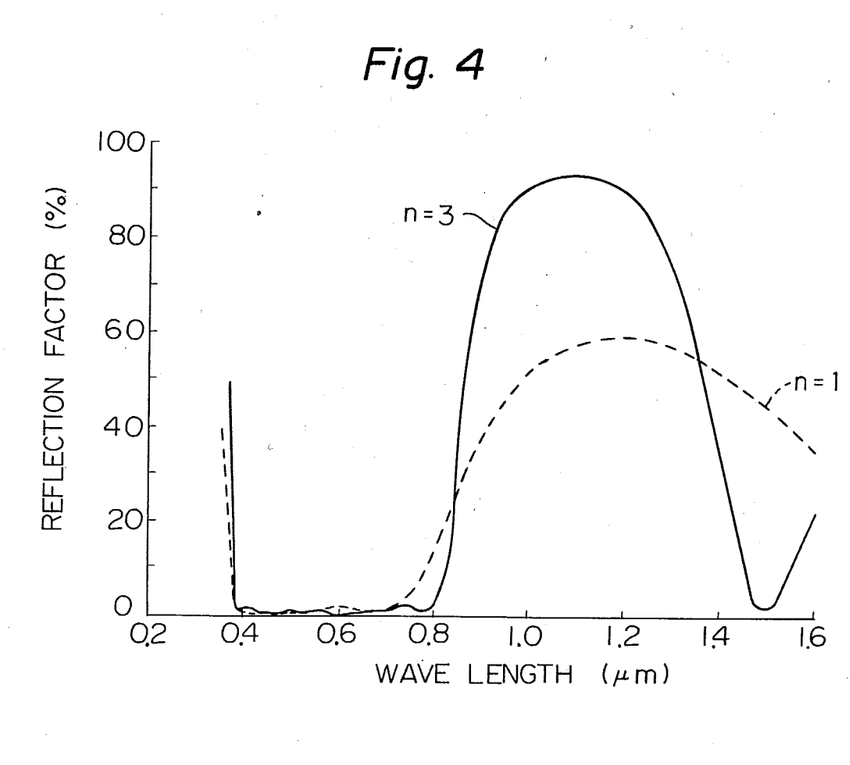
FIG. 4 is a graph showing the reflection factor of the heat-reflection film of the present invention in which $n=1$ and $n=3$.

Another embodiment of the present invention is described hereinafter. The graph of FIG. 4 shows the reflection factor of a heat-reflection film in which the number of intermediate layers having a $\lambda/4$ optical thickness is different from that of the embodiment of FIG. 1. The solid line A of the graph represents the case of $n=3$, i.e., a heat-reflection film comprising nine $(2n+3)$ layers on the base plate, that is: a first layer having an optical thickness of $\lambda/8$; second, fourth, sixth, and eighth layers of high refractive index material having an optical thickness of $\lambda/4$; third, fifth, and seventh layers of low refractive index material having an optical thickness of $\lambda/4$; and an uppermost ninth layer of low refractive index material having an optical thickness of $\lambda/8$. The broken line B of the graph represents the case of $n=1$, i.e., a heat-reflection film comprising five $(2n+3)$ layers on the base plate, that is: a first layer having an optical thickness of $\lambda/8$; second and fourth layers of high refractive index material having an optical thickness of $\lambda/4$; a third layer of low refractive index material having an optical thickness of $\lambda/4$; and an uppermost fifth layer of low refractive index material having an optical thickness of $\lambda/8$.

The reflection factor with respect to heat rays increases when the number n is increased. The effect of the suppression of reflection of visible rays is almost the same as that of the embodiment of FIG. 1, irrespective of the number n.

Figure 5:
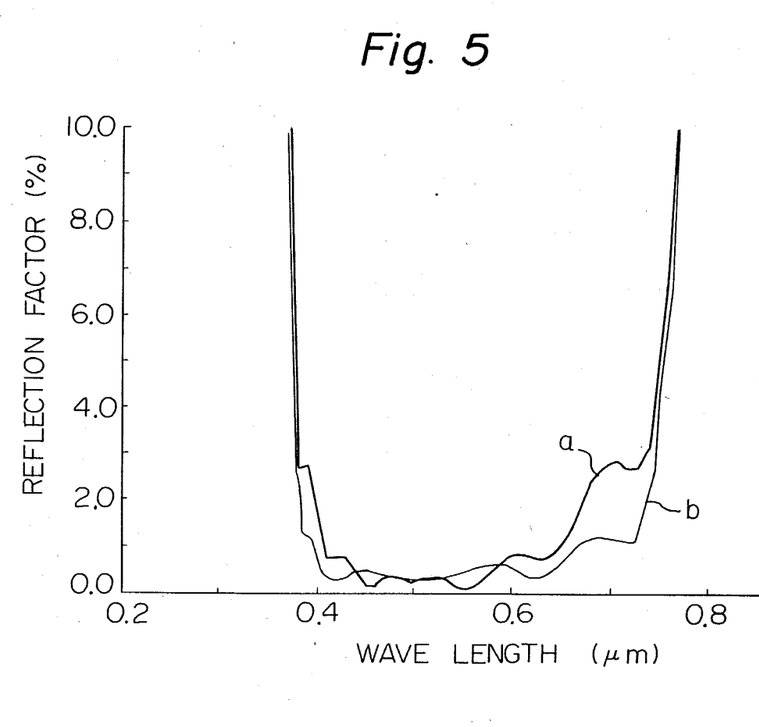
FIG. 5 is a graph showing the reflection factor of the heat-reflection film of FIG. 1 in which the optical thickness of the first layer is changed as compared with the film of FIG. 1 which the optical thickness of the first layer is unchanged.

In FIG. 5, the line a represents the reflection factor of a heat-reflection film having a first layer having an optical thickness of $3\lambda/8$, other characteristics thereof being the same as those of FIG. 1. The line b represents the reflection factor of the heat-reflection film of FIG. 1, which film has a first layer having an optical thickness of $\lambda/8$. As can be seen from the graph, the reflection of visible rays is effectively suppressed in a case where the optical thickness of the first layer is $3\lambda/8$ as well as in a case where the optical thickness of the first layer is $\lambda/8$. The following is considered to be the reason for this.

The relation between the wavelength A of the region in which light is reflected and the wavelength B of the region in which light penetrates is defined as $B = (\frac{1}{2})A$. For example, when the designed wavelength $\lambda$ of the region in which light is reflected is 1.0 $\mu$m, the wavelength of penetrating light with respect to the designed wavelength $\lambda$ is $\lambda/2 = 0.5$ $\mu$m.

Figure 6:
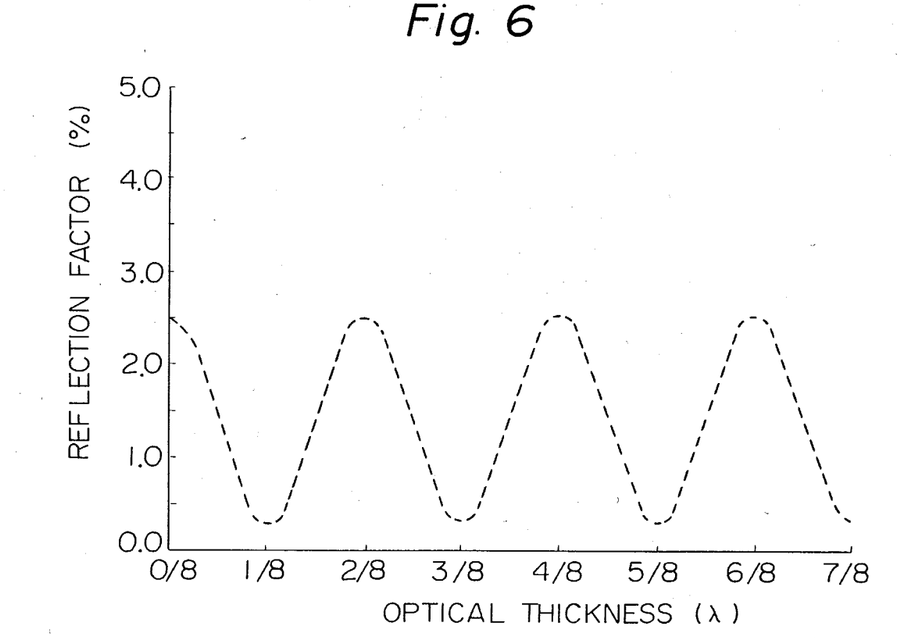
FIG. 6 is a graph showing the reflection factor of the heat-reflection film of FIG. 1 with respect to the penetrating light in relation to the optical thickness.

The inventors discovered the relation between the reflection factor with respect to light having a wavelength of $\lambda/2 = 0.5$ $\mu$m and the optical thickness of the first layer as represented in FIG. 6. As can be seen from the graph of FIG. 6, the reflection factor is lowered when the optical thickness is $3\lambda/8$, $5\lambda/8$, or $7\lambda/8$, as well as λ/8. That is, if heat rays having a wavelength of 1.0 μm are to be reflected, the reflection of light having a wavelength of 0.5 μm is suppressed by determining the optical thickness of the first layer to be λ/8, 3λ/8, 5λ/8, or 7λ/8. However, it is not practical for the heat-reflection film to suppress the reflection of only visible rays having an optical thickness of 0.5 μm. The reflection of all of the visible rays within a wavelength range of from about 0.4 to 0.7 μm should be suppressed.

Figure 7:
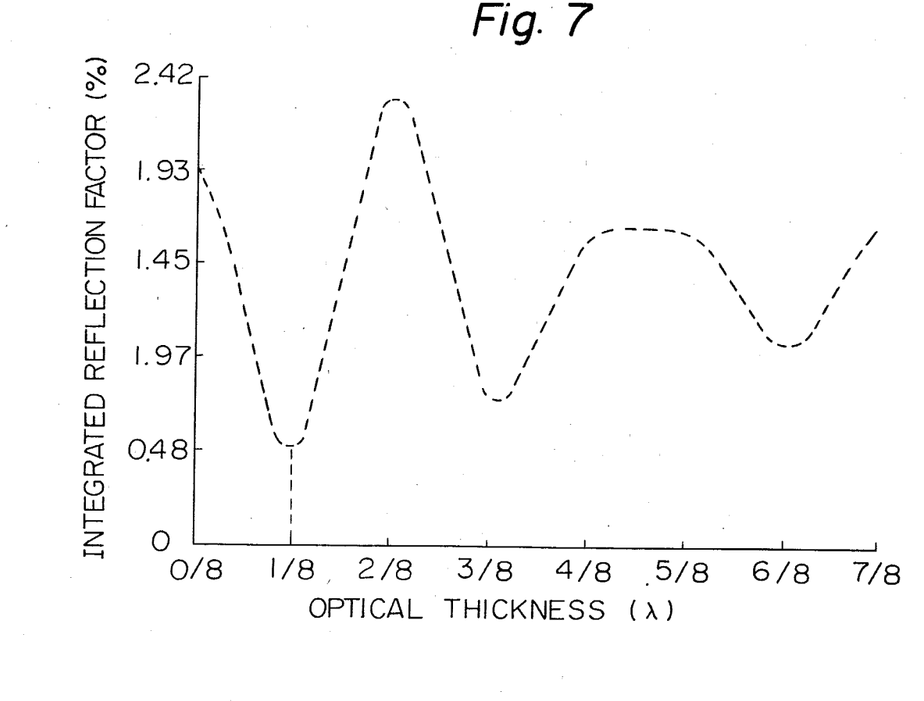
FIG. 7 is a graph showing the integrated reflection factor of the heat-reflection film of the present invention in relation to the optical thickness.

In order to confirm suppression of the reflection suppression of all of the visible rays within a wavelength range of from about 0.4 to 0.7 μm by the heat-reflection film of the present invention, inventors performed an experiment in which the integrated reflection factor with respect to all of the visible rays was measured in relation to a change in the optical thickness of the first layer, with the designed wavelength λ being 1.04 μm. The value of the integrated reflection factor was defined as 100% when the heat reflection film had a total reflection with respect to all of the visible rays having a wavelength of from 0.4 to 0.7 μm. The result of the experiment is shown in FIG. 7. As can be seen from the graph of FIG. 7, the effect of suppression of the reflection of visible rays was enhanced when the optical thickness of the first layer was λ/8 or 3λ/8. The value of the integrated reflection factor when the optical thickness was λ/8 was different from that when the optical thickness was 3λ/8. Also, the integrated reflection factor did not periodically decrease when the optical thickness was 5λ/8. It is considered that the reason for these findings is that the position of the reflection peaks of visible rays having a wavelength of between 0.4 and 0.7 μm is shifted according to the optical thickness of the first layer. Also, as can be seen from the graph of FIG. 7, reflection is sufficiently suppressed not only when the optical thickness is precisely λ/8 or 3λ/8 but also when the optical thickness is in the vicinity of λ/8 or 3λ/8.

As was mentioned above, the heat-reflection film according to the present invention has the effect of greatly suppressing the reflection of visible rays without degrading the reflection ability of heat rays.

We claim:

1. A heat-reflection film comprising:
 a first layer formed on a base plate which is transparent for visible rays, the optical thickness of said first layer being approximately λ/8 or 3λ/8, in which λ is a designed wavelength;
 a plurality of intermediate layers from a second layer to a (2n+2)th layer, in which n is a positive integral number, the optical thickness of each intermediate layer being λ/4;
 an uppermost (2n+3)th layer, the optical thickness of which is approximately λ/8,
 wherein $n_g < n_1 < n_2$, in which $n_g$ is the refractive index of said base plate, $n_1$ is the refractive index of said first layer, and $n_2$ is the refractive index of said second layer, the layers formed above said first layer being arranged in such a manner that high refractive index layers and low refractive index layers are alternately stacked, said second layer being arranged as a high refractive index layer;
 said heat-reflection film including said layers and said base plate being constructed and arranged so as to have a reflection ratio for visible rays which is smaller than the reflection ratio for visible rays of said base plate; and
 said heat-reflection film including said layers and said base plate being constructed and arranged so as to have a reflection ratio for infrared rays which is greater than the reflection ratio for infrared rays of said base plate.

2. A heat-reflection film as set forth in claim 1, in which each of said high refractive index layers is formed from material selected from $ZrO_2$, $TiO_2$, and $CeO_2$ and in which each of said low refractive index layers in formed from material selected from $MgF_2$, $SiO_2$, $Na_3AlF_3$, and $CeF_4$.

3. A heat-reflection film as set forth in claim 1, in which n=2 so that five intermediate layers are stacked between said first layer and said uppermost layer.

4. A heat-reflection film as set forth in claim 1, in which said first layer is formed from material selected from $CeF_3$, $Al_2O_3$, $SnO_2$, $PbF_3$, $NdF_3$, $Pr_6O_{11}$, and $In_2O_3$ and a combination thereof.

5. A heat-reflection film as set forth in claim 1, in which said first layer is formed from a mixture of $ZrO_2$ and $MgF_2$.

6. A heat-reflection film as set forth in claim 1, in which said first layer comprises electrically conductive and optically transparent film.

7. A heat-reflection film as set forth in claim 1, in which the refractive index of said uppermost layer is the same as or less than that of said low refractive index layer.

* * * * *